(12) United States Patent
Oh et al.

(10) Patent No.: US 12,315,270 B2
(45) Date of Patent: May 27, 2025

(54) ELECTRONIC DEVICE FOR DETERMINING BUMPS AND DEPRESSIONS ON GROUND AND OPERATION METHOD THEREOF

(71) Applicant: Nextchip Co., Ltd., Seongnam-si (KR)

(72) Inventors: Young Seok Oh, Seoul (KR); Hye Seong Jo, Seongnam-si (KR); Kyoung Tae Kim, Seongnam-si (KR)

(73) Assignee: Nextchip Co., Ltd., Seongnam-si (KR)

( * ) Notice: Subject to any disclaimer, the term of this patent is extended or adjusted under 35 U.S.C. 154(b) by 252 days.

(21) Appl. No.: 18/249,791

(22) PCT Filed: Nov. 27, 2020

(86) PCT No.: PCT/KR2020/017055
§ 371 (c)(1),
(2) Date: Apr. 20, 2023

(87) PCT Pub. No.: WO2022/114283
PCT Pub. Date: Jun. 2, 2022

(65) Prior Publication Data
US 2023/0386223 A1 Nov. 30, 2023

(30) Foreign Application Priority Data
Nov. 24, 2020 (KR) .......................... 10-2020-0159066

(51) Int. Cl.
*G06V 20/56* (2022.01)
*B60W 40/06* (2012.01)
(Continued)

(52) U.S. Cl.
CPC ........... *G06V 20/588* (2022.01); *B60W 40/06* (2013.01); *B60W 50/14* (2013.01);
(Continued)

(58) Field of Classification Search
CPC ...... G06V 20/588; G06V 10/44; G06V 20/56; B60W 40/06; B60W 50/14; B60W 60/001;
(Continued)

(56) References Cited

U.S. PATENT DOCUMENTS

2009/0097038 A1 4/2009 Higgins-Luthman et al.
2017/0124725 A1* 5/2017 Sumiyoshi ........... G06V 20/588

FOREIGN PATENT DOCUMENTS

JP 2005-300294 A 10/2005
JP 2010-040015 A 2/2010
(Continued)

*Primary Examiner* — Yuen Wong
(74) *Attorney, Agent, or Firm* — DALY, CROWLEY, MOFFORD & DURKEE, LLP

(57) ABSTRACT

In order to determine whether bumps and depressions are present on the ground in a target image, the present invention: acquires a V-disparity map on the basis of a target image acquired by means of an image sensor; detects, in the V-disparity map, at least one component indicating information about the ground in the target image; determines a polynomial in a coordinate system in the V-disparity map for the component; determines a straight line passing through two different inflection points on a curve, which corresponds to the polynomial, in the coordinate system in the V-disparity map; determines a target point on the curve, the target point having a tangential slope identical to the slope of the straight line; calculates the distance between the straight line and the target point; and determines, on the basis of the distance, whether the ground includes bumps and depressions.

17 Claims, 9 Drawing Sheets

(51) Int. Cl.
  *B60W 50/14*  (2020.01)
  *B60W 60/00*  (2020.01)
  *G06T 7/64*  (2017.01)
(52) U.S. Cl.
  CPC .............. *B60W 60/001* (2020.02); *G06T 7/64* (2017.01); *B60W 2420/403* (2013.01); *B60W 2552/20* (2020.02); *G06T 2207/30252* (2013.01)
(58) Field of Classification Search
  CPC ........ B60W 2420/403; B60W 2552/20; G06T 7/64; G06T 2207/30252; G06T 2207/10012; G06T 2207/20081; G06T 2207/20084; G06T 2207/30256; G06T 7/73; G06T 7/11; B60K 35/22; B60K 35/29; B60K 2360/176; B60K 2360/178; B60K 35/21; B60K 35/23; B60K 2360/179; B60K 2360/21
  See application file for complete search history.

(56) References Cited

FOREIGN PATENT DOCUMENTS

| | | |
|---|---|---|
| JP | 2015-179302 A | 10/2015 |
| KR | 2013-0053980 A | 5/2013 |
| KR | 2013-0068258 A | 6/2013 |
| KR | 2019-0088647 A | 7/2019 |
| KR | 10-2083482 B1 | 3/2020 |
| KR | 2020-0042100 A | 4/2020 |

\* cited by examiner

ELECTRONIC DEVICE FOR DETERMINING BUMPS AND DEPRESSIONS ON GROUND AND OPERATION METHOD THEREOF

TECHNICAL FIELD

The following embodiments relate to a technique for determining bumps and depressions on the ground in a target image, and more particularly, to a technique for detecting a component indicating information about the ground in the image and determining the bumps and the depressions on the ground, based on a polynomial with respect to the detected component.

BACKGROUND ART

An autonomous vehicle or a vehicle supporting an Advanced Driver Assistance System (ADAS) may recognize a situation around the vehicle, using one or more sensors, and need appropriate vehicle control for the recognized situation. For example, lanes on a road and objects around a vehicle may be detected to recognize a situation around the vehicle. In order to detect lanes or objects, an image may be generated by using a camera of the vehicle and an object in the image may be identified.

A method of identifying the shape of the ground may include a method using a distance sensor, which needs to be installed outside a vehicle for precision, resulting in deformation of the vehicle and a high installation cost.

In the related prior art, there is Korean Patent Registration No. 10-2083482 (Title of Invention: a method and device for detecting a vehicle drivable area based on Light Detection and Ranging (LiDAR), Applicant: the Industry-Academic Cooperation Foundation of Kookmin University). The registered patent publication discloses a LiDAR-based device for detecting a vehicle drivable area. Specifically, the device of the prior art includes a vehicle driving detector configured to detect whether the vehicle is driving; a local driving map generator configured to activate a LiDAR sensor to stack point cloud data and generate a local driving map based on the point cloud data when the vehicle starts driving; a road boundary object detector configured to remove a road surface by applying a plane model to the local driving map, thereby detecting a road boundary object; and a drivable area determiner configured to determine a grid map corresponding to a current road according to a position of the road boundary object and determine a drivable area based on the grid map.

DISCLOSURE OF THE INVENTION

Technical Goals

An embodiment may provide a device and method for determining whether bumps and depressions are present on the ground in a target image.

An embodiment may provide a device and method for detecting a component indicating information about the ground in the target image and determining whether bumps and depressions are present on the ground, based on the detected component.

However, the technical aspects are not limited to the aforementioned aspects, and other technical aspects may be present.

Technical Solutions

According to an aspect, a method of determining bumps and depressions on the ground, which is executed by an electronic device, the method includes: acquiring a V-disparity map on the basis of a target image acquired by means of an image sensor; detecting, in the V-disparity map, at least one component indicating information about the ground in the target image; determining a polynomial in a coordinate system in the V-disparity map for the component; determining a linear line passing through two different inflection points on a curve, which corresponds to the polynomial, in the coordinate system in the V-disparity map; determining a target point on the curve, the target point having a tangential slope identical to the slope of the linear line; calculating the distance between the linear line and the target point; and determining, on the basis of the distance, whether the ground comprises bumps and depressions.

The electronic device may be included in a vehicle, and the target image may be an image capturing surroundings of the vehicle.

The vehicle may be an autonomous vehicle or a vehicle supporting an Advanced Driver Assistance System (ADAS).

The detecting of, in the V-disparity map, the at least one component indicating the information about the ground in the target image may include: determining a horizontal line for a vanishing point of the target image, based on a Random Sample Consensus (RANSAC) algorithm; and detecting the at least one component indicating the information about the ground among components under the horizontal line.

The determining of the polynomial in the coordinate system in the V-disparity map for the component may include determining the polynomial based on a Random Sample Consensus (RANSAC) algorithm.

The determining of the polynomial in the coordinate system in the V-disparity map for the component may include determining a degree of the polynomial based on a Least Square Error (LSE).

The determining of the linear line passing through the two different inflection points on the curve, which corresponds to the polynomial, in the coordinate system in the V-disparity map may include, when a number of inflection points on the curve is three or more, determining a plurality of linear lines passing through two adjacent inflection points.

The method may further include, when it is determined that the ground includes bumps and depressions, displaying a point where the bumps and the depressions are present, on the target image; and giving a warning when a vehicle approaches the point.

The displaying of the point where the bumps and the depressions are present, on the target image comprises distinguishing a case where the bumps and the depressions are formed above the ground from a case where the bumps and the depressions are formed below the ground and displaying the distinguished cases; and differentiating an output graphic object based on a degree of the bumps and the depressions.

According to another aspect, an electronic device for performing a method of determining bumps and depressions on the ground, the electronic device includes: a memory configured to store a program for determining the bumps and the depressions on the ground; and a processor configured to execute the program. The program may be configured to: acquire a V-disparity map on the basis of a target image acquired by means of an image sensor; detect, in the V-disparity map, at least one component indicating information about the ground in the target image; determine a polynomial in a coordinate system in the V-disparity map for the component; determine a linear line passing through two different inflection points on a curve, which corresponds to the polynomial, in the coordinate system in the V-disparity map, determine a target point on the curve, the target point having a tangential slope identical to the slope of the linear line; calculate the distance between the linear line and the target point; and determine, on the basis of the distance, whether the ground includes bumps and depressions.

The electronic device may be included in a vehicle, and the target image may be an image capturing surroundings of the vehicle.

The vehicle may be an autonomous vehicle or a vehicle supporting an ADAS.

The detecting of, in the V-disparity map, the at least one component indicating the information about the ground in the target image may include: determining a horizontal line for a vanishing point of the target image, based on an RANSAC algorithm; and detecting the at least one component indicating the information about the ground among components under the horizontal line.

The determining of the polynomial in the coordinate system in the V-disparity map for the component may include determining the polynomial based on an RANSAC algorithm.

The determining of the polynomial in the coordinate system in the V-disparity map for the component may include determining a degree of the polynomial based on an LSE.

The determining of the linear line passing through the two different inflection points on the curve, which corresponds to the polynomial, in the coordinate system in the V-disparity map may include, when a number of inflection points on the curve is three or more, determining a plurality of linear lines passing through two adjacent inflection points.

The electronic device may further include, when it is determined that the ground includes bumps and depressions, displaying a point where the bumps and the depressions are present, on the target image; and giving a warning when a vehicle approaches the point.

The displaying of the point where the bumps and the depressions are present, on the target image may include: distinguishing a case where the bumps and the depressions are formed above the ground from a case where the bumps and the depressions are formed below the ground and displaying the distinguished cases; and differentiating an output graphic object based on a degree of the bumps and the depressions.

Effects

The present disclosure may provide a device and method for determining whether the ground in an image includes bumps and depressions.

The present disclosure may provide a device and method for detecting a component indicating information about the ground in an image and determining whether the ground in the image includes bumps and depressions, based on the detected component.

DETAILED DESCRIPTION

Figure 1:
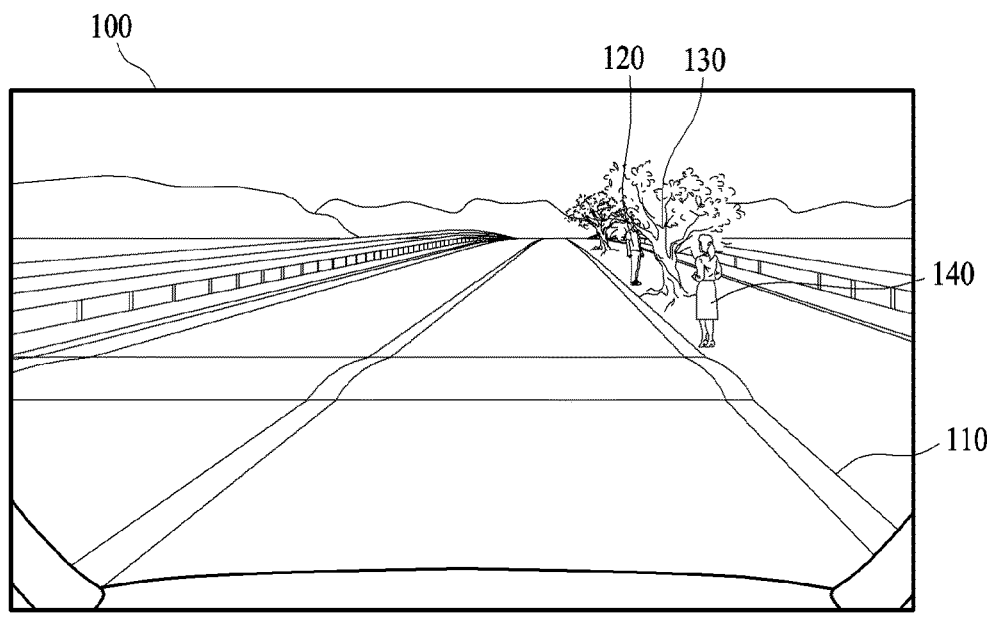
FIG. 1 illustrates a target image according to an embodiment.

Best Mode for Carrying Out the Invention

The following detailed structural or functional description is provided as an example only and various alterations and modifications may be made to the examples. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. When describing the embodiments with reference to the accompanying drawings, like reference numerals refer to like constituent elements and a repeated description related thereto will be omitted.

Device for Determining Bumps and Depressions on the Ground

FIG. 1 illustrates a target image according to an embodiment.

According to an aspect, a shape 110 of the ground and objects 120, 130, and 140, corresponding a pedestrian, a street tree, or the like, in a target image 100 may be detected by using the target image 100 capturing the front view of a vehicle. The ground may be a road surface when the vehicle drives on the road. Whether bumps and depressions are present in the ground, which is determined from the shape 110 of the ground, may be used for vehicle control. For example, when the vehicle is an autonomous vehicle or a vehicle supporting an Advanced Driver Assistance System (ADAS), information about the shape 110 of the ground may be used to generate a driving path of the vehicle.

In the autonomous driving field, a method of identifying the shape of the ground may include a method using a distance sensor, which needs to be installed outside a vehicle for precision, resulting in deformation of the vehicle and a high installation cost.

A method of determining whether bumps and depressions are present on the ground in a target image based on the detected shape of the ground may be described in detail with reference to FIGS. 2 to 8B below.

Figure 2:
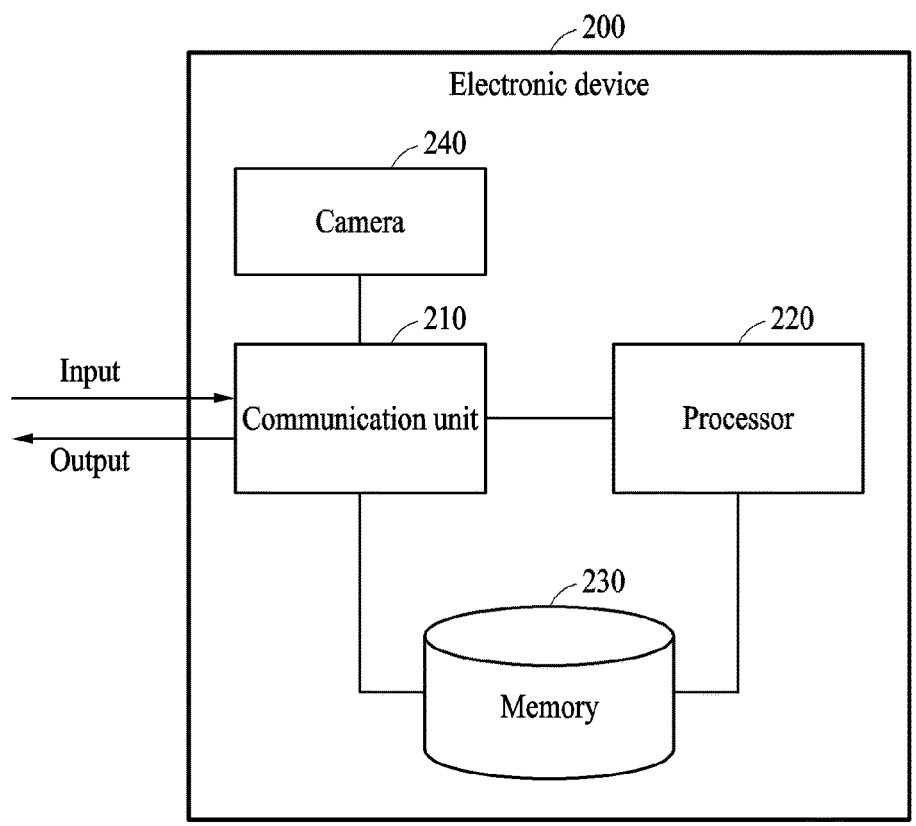
FIG. 2 is a diagram illustrating a configuration of an electronic device according to an embodiment.

FIG. 2 is a diagram illustrating a configuration of an electronic device according to an embodiment.

An electronic device 200 may include a communicator 210, a processor 220, and a memory 230. For example, the electronic device 200 may be included in the vehicle described with reference to FIG. 1. According to an aspect, the electronic device 200 may further include a camera 240 for generating a target image by capturing a scene around the vehicle. The camera 240 may be a monocular camera or a stereo vision camera.

The communicator 210 may be connected to the processor 220 and the memory 230 and transmit and receive data to and from the processor 220 and the memory 230. The communicator 210 may be connected to another external apparatus and transmit and receive data to and from the external apparatus. Hereinafter, transmitting and receiving "A" may refer to transmitting and receiving "information or data indicating A".

The communicator 210 may be implemented as circuitry in the electronic device 200. For example, the communicator 210 may include an internal bus and an external bus. In another example, the communicator 210 may be an element that connects the electronic device 200 to the external apparatus. The communicator 210 may be an interface. The communicator 210 may receive data from the external apparatus and transmit the data to the processor 220 and the memory 230.

The processor 220 may process data received by the communicator 210 and stored in the memory 230. A "processor" described herein may be a hardware-implemented data processing apparatus having a physically structured circuit to execute desired operations. For example, the desired operations may include code or instructions included in a program. For example, the hardware-implemented data processing apparatus may include a microprocessor, a central processing unit (CPU), a processor core, a multi-core processor, a multiprocessor, an application-specific integrated circuit (ASIC), and a field-programmable gate array (FPGA).

The processor 220 may execute a computer-readable code (for example, software) stored in a memory (for example, the memory 230) and instructions triggered by the processor 220.

The memory 230 may store the data received by the communicator 210 and data processed by the processor 220. For example, the memory 230 may store the program (or an application, or software). The stored program may be a set of syntaxes that are coded to detect bumps and depressions on the ground in an image and executable by the processor 220.

The memory 230 may include, for example, at least one of a volatile memory, a nonvolatile memory, a random-access memory (RAM), a flash memory, a hard disk drive, and an optical disc drive.

The memory 230 may store an instruction set (for example, software) for operating the electronic device 200. The instruction set for operating the electronic device 200 may be executed by the processor 220.

The communication unit 210, the processor 220, and the memory 230 are be described in detail below with reference to FIGS. 3 to 8B.

Method of Determining Bumps and Depressions on Ground

Figure 3:
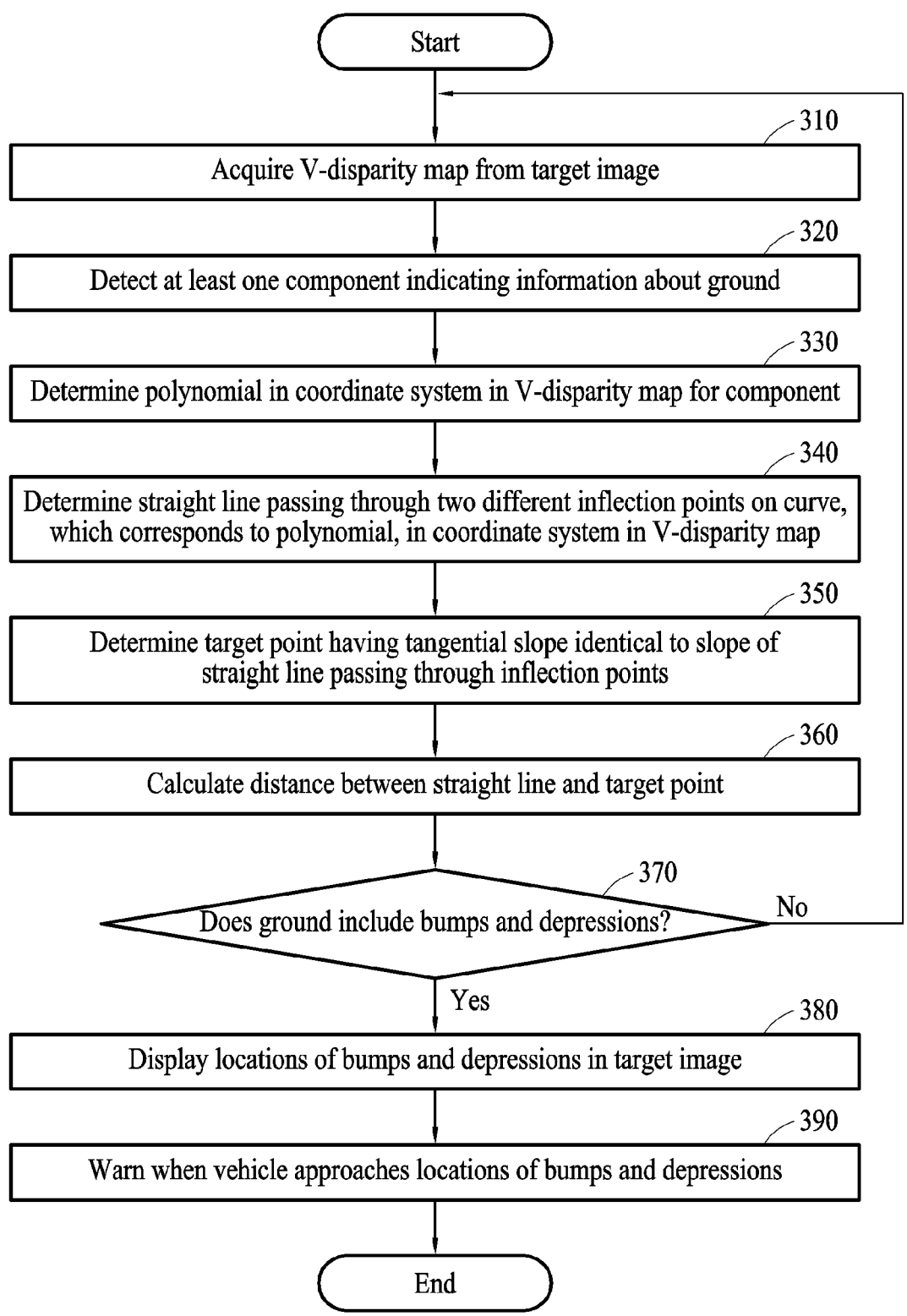
FIG. 3 is a flowchart illustrating a method of determining bumps and depressions on the ground, according to an embodiment.

FIG. 3 is a flowchart illustrating a method of determining bumps and depressions on the ground, according to an embodiment.

Operations 310 to 390 described below are performed by the electronic device 200 described above with reference to FIG. 2.

In operation 310, the electronic device 200 may acquire a V-disparity map from a target image acquired by means of an image sensor of the camera 240. The image sensor may be a semiconductor that is built in the camera 240 and converts light entering through the lens of the camera 240 into an electrical signal and may be a color image sensor, a red, green, blue (RGB) sensor, or an infrared (IR) sensor.

According to an aspect, operation 310 of acquiring the V-disparity map from the target image may include acquiring a disparity map from the target image and acquiring the V-disparity map from the disparity map. When the camera 240 is a stereo vision camera or a binocular camera, the disparity map may be calculated by calculating a disparity between images based on one of two captured images.

When the camera 240 is a monocular camera, an inverse depth map in the same form as the disparity map may be calculated by using a convolutional neural network (CNN). Since a model for acquiring the disparity map is needed for a monocular camera, unlike the stereo vision camera, the used CNN may need to be trained. To acquire a trained model, a monocular camera and a sensor, such as a stereo vision sensor or a Light Detection and Ranging (LiDAR) sensor, may be used to train the model. When the V-disparity map is also able to be acquired through the monocular camera, a vehicle with a dash camera installed therein may acquire the V-disparity map. The V-disparity map may be a histogram in which portions having the same disparity value are accumulated and displayed based on the vertical axis of the disparity map. In the V-disparity map, the horizontal axis may represent a disparity value and the vertical axis may represent the height of an object.

In operation 320, the electronic device 200 may detect, in the V-disparity map obtained in operation 310, at least one component indicating information about the ground in the target image 310. In the V-disparity map, the shape of the ground may appear in a diagonal form since a distance from the position of the vehicle gradually increases, and an object other than the ground may appear in a form where a distance value is predetermined vertically. The component indicating the information about the ground may be a point, a linear line, a curve, and the like. A method of detecting at least one component indicating the information about the ground from the V-disparity map is described in detail below with reference to FIGS. 4 to 5D.

In operation 330, the electronic device 200 may determine a polynomial in a coordinate system in the V-disparity map for the at least one component.

According to an aspect, the electronic device 200 may determine the polynomial based on a Random Sample Consensus (RANSAC) algorithm. However, the algorithm is not limited to the RANSAC algorithm, and the polynomial may be determined based on Hough Transform or Dynamic Programming. The RANSAC algorithm may be an algorithm of randomly selecting sample data and then making a selection, which is most agreed upon, and may be an algorithm of selecting a model that is considered appropriate by the majority of pieces of data. The coordinate system may be a two-dimensional (2D) coordinate system having an x-axis and a y-axis. A method of determining the polynomial of the coordinate system in the V-disparity map for the component is described in detail below with reference to FIG. 6A.

In operation 340, the electronic device 200 may determine a linear line passing through two different inflection points on a curve, which corresponds to the polynomial, in the coordinate system in the V-disparity map. Depending on the state of the ground, there may be areas including two or more bumps and depressions. In such a case, the curve corresponding to the polynomial according to an example in the coordinate system in the V-disparity map may have three or more inflection points. When there are three or more inflection points, a plurality of linear lines passing through two adjacent inflection points may be determined.

In operation 350, the electronic device 200 may determine a target point on the curve, the target point having a tangential slope identical to the slope of the linear line. As described above, when the curve corresponding to the polynomial in the coordinate system in the V-disparity map has three or more inflection points, the electronic device 200 may determine a plurality of target points having the same tangential slope as a plurality of linear lines passing through two adjacent inflection points.

In operation 360, the electronic device 200 may calculate a distance between the linear line and the target point. As described above, when the curve corresponding to the polynomial in the coordinate system in the V-disparity map has three or more inflection points, the electronic device 200 may calculate distances between the plurality of linear lines passing through two adjacent inflection points and the plurality of target points. Operations 340 to 360 are described in detail below with reference to FIG. 6B.

In operation 370, the electronic device 200 may determine whether bumps and depressions are present on the ground, based on the distance between the linear line and the target point. When the distance is less than a threshold value, it may be determined that the ground does not include bumps and depressions. Whether bumps and depressions are present on other ground may be determined by using another target image acquired through an image sensor.

When the distance is greater than or equal to the threshold value, it may be determined that the ground includes bumps and depressions and then operations 380 and 390 may be performed. In operation 380, the electronic device 200 may display a point indicating the bumps and the depressions on the target image. A method of displaying the point indicating the bumps and the depressions on the target image is described in detail with reference to FIGS. 7 to 8B below.

In operation 390, the electronic device 200 may give a warning when the vehicle approaches the point indicating the bumps and the depressions. When the vehicle supports an ADAS, the electronic device 200 may transmit the warning to a driver to pay attention to the bumps and the depressions on the road ahead in the form of visual or auditory feedback. When the vehicle is an autonomous vehicle, the electronic device 200 may transmit the warning to a driver or generate a driving path of the vehicle without the warning based on information about the ground including the bumps and the depressions.

Figure 4:
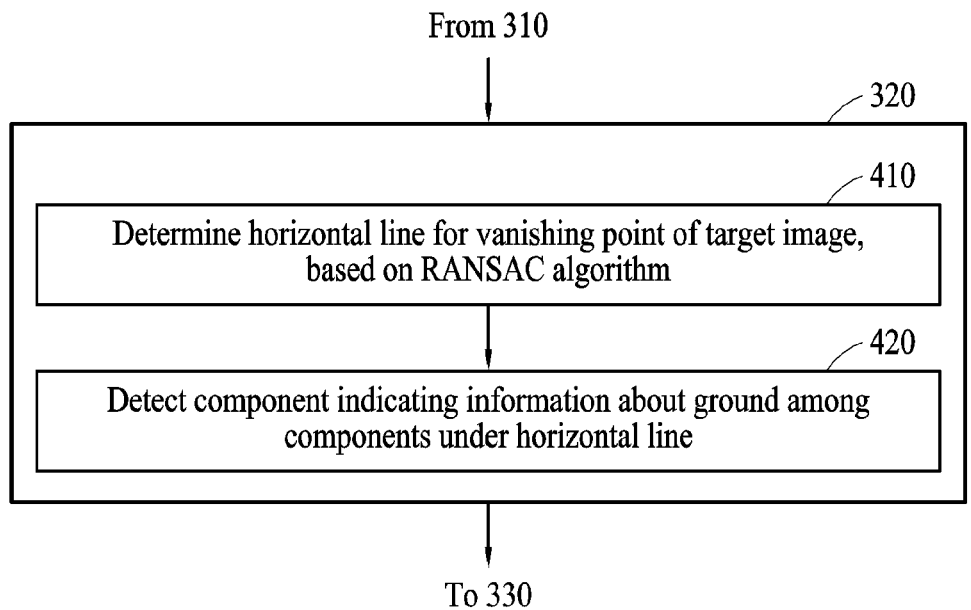
FIG. 4 is a flowchart illustrating a method of detecting at least one component indicating information about the ground in a target image of a V-disparity map, according to an embodiment.

FIG. 4 is a flowchart illustrating a method of detecting at least one component indicating information about the ground in a target image in a V-disparity map, according to an embodiment.

Operation 320 described above with reference to FIG. 3 may include operations 410 and 420 below.

In operation 410, an electronic device 200 may determine a horizontal line for the vanishing point of a target image 100, based on an RANSAC algorithm. The determining of the horizontal line is described in detail with reference to FIG. 5B below.

In operation 420, the electronic device 200 may determine a horizontal line corresponding to the target image in the V-disparity map, determine a component below the horizontal line to be a target area based on the determined horizontal line, and then detect a component indicating information about the ground. The detecting of the component indicating the information about the ground is described in detail with reference to FIGS. 5B to 5D below.

Figure 5A:
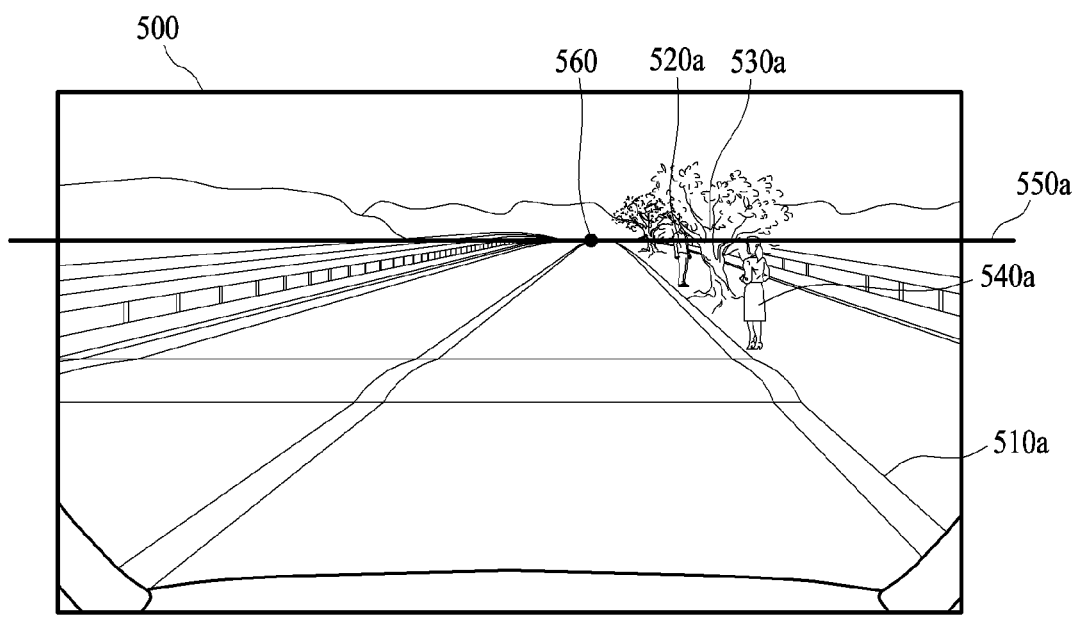
FIG. 5A illustrates a vanishing point and a horizontal line in a target image, according to an embodiment.

FIG. 5A illustrates a vanishing point and a horizontal line in a target image, according to an embodiment.

FIG. 5A may illustrate a vanishing point 560 and a horizontal line 550a, a shape 510a of the ground, and objects 520a, 530a, and 540a other than the ground, such as a pedestrian or a street tree, in a target image 500. The vanishing point 560 may be determined based on various algorithms. For example, a point where edges in the target image 500 converge may be determined to be a vanishing point. The position of the vanishing point may be the coordinates of a specific pixel among pixels in the target image 500. The horizontal line 550a may be expressed in the form of a linear line that is horizontal to the vanishing point 560 and may be estimated by using, for example, camera parameters or estimated as a linear line. In an estimation method of the linear line, the horizontal line 550a may be calculated by using the RANSAC algorithm to find a solution indicating an optimal linear line for the V-disparity map. More specifically, a virtual linear line may be created by randomly selecting two points in the V-disparity map and the number T of components closest to the linear line may be obtained. When the number T of components is greater than a threshold value, the parameters of a current linear line may be stored. When such a process is repeated N number times such that a finally stored linear line is returned, the horizontal line 550a, which is estimated, may be calculated. In this case, T and N may be arbitrarily set. A method of calculating the coordinate value of the horizontal line 550a is described in detail with reference to FIG. 5B below.

Figure 5B:
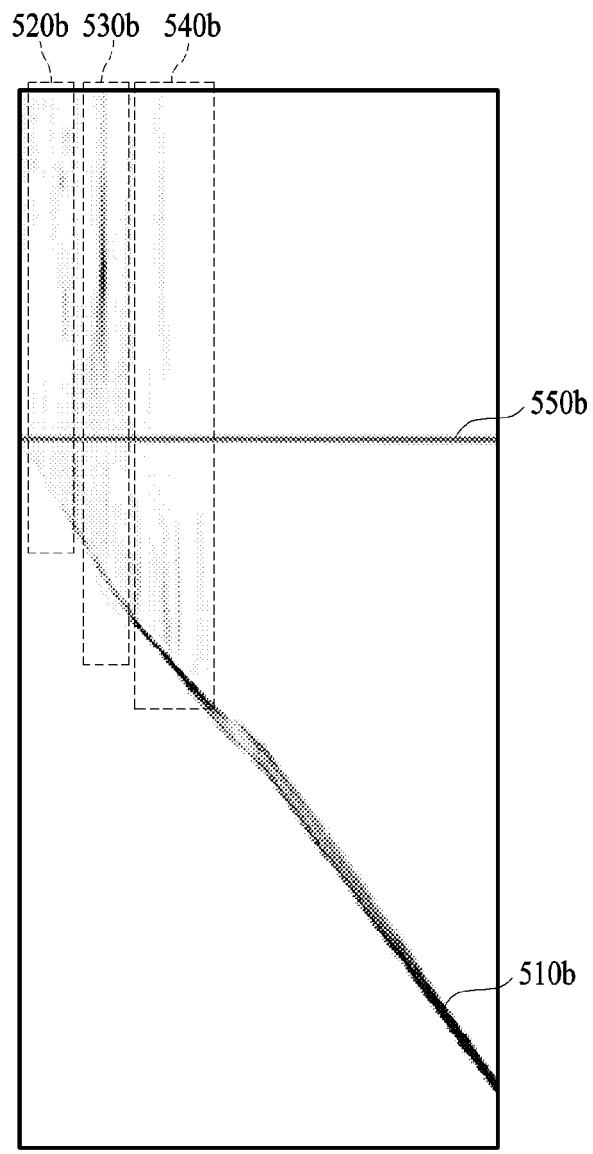
FIGS. 5B to 5D are diagrams illustrating a method of detecting at least one component indicating information about the ground in a target image of a V-disparity map, according to an embodiment.
Figure 5C:
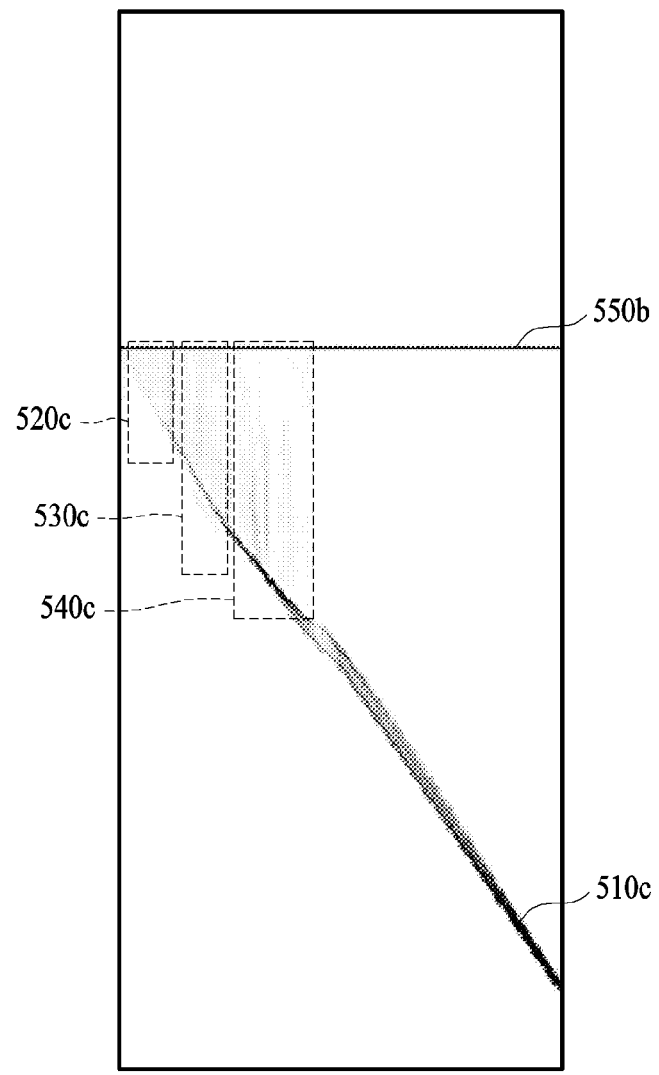
Figure 5D:
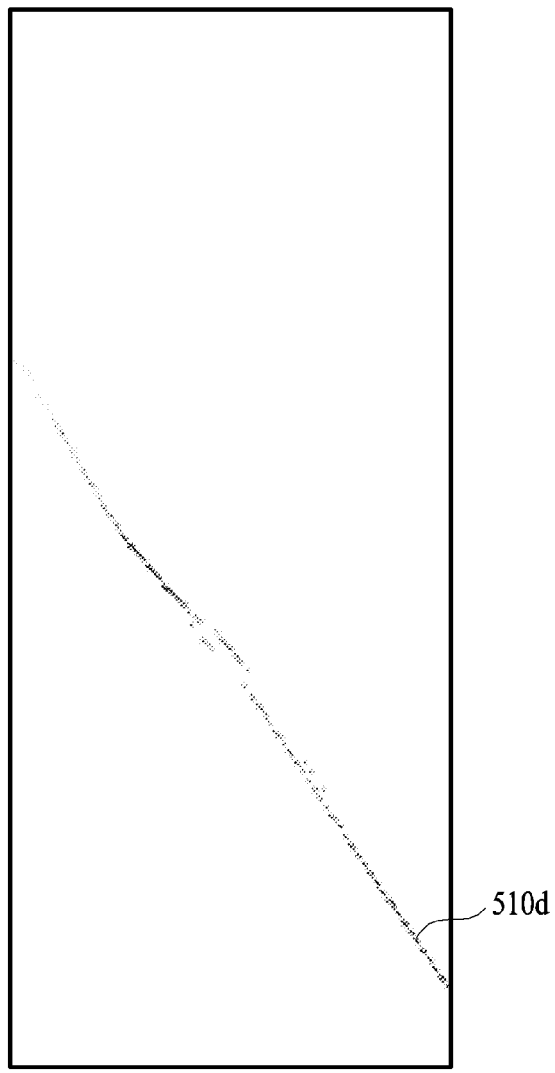

FIGS. 5B to 5D are diagrams illustrating a method of detecting at least one component indicating information about the ground in a target image in a V-disparity map, according to an embodiment.

FIG. 5B may illustrate a horizontal line 550b in the V-disparity map and components 510b, 520b, 530b, and 540b indicating information about the objects 510a, 520a, 530a, and 540a in the target image of the V-disparity map. Based on the linear line returned according to the estimation method of the linear line described with reference to FIG. 5A, the vertical axis coordinate value of the horizontal line 550b in the V-disparity map may be calculated through [Equation 1] below.

$$vhor = \text{round}\left(-\frac{b}{a}\right) \qquad [\text{Equation 1}]$$

In [Equation 1], vhor may denote the vertical axis coordinate value of the horizontal line 550b, a may denote the slope of the linear line finally returned by the RANSAC algorithm described with reference to FIG. 5A, b may denote the y-intercept of the finally stored linear line, and round may denote round up. However, as described with reference to FIG. 5A, the coordinates of the horizontal line 550b may be calculated in various manners.

FIG. 5C may illustrate the horizontal line 550b and components 510c, 520c, 530c, and 540c indicating remaining objects after removing components above the vertical coordinates of the horizontal line 550b from FIG. 5B. Since the components above the horizontal line 550b are not related to the shape of the ground, the components above the horizontal line 550b may be removed.

Referring to FIG. 5D, only a component 510d may be shown, which indicates information about the ground after other components are removed from FIG. 5C. The components above the horizontal line 550b may be removed from FIG. 5C and a component indicating information about the ground among the components below the horizontal line 550b may be accumulated most in each column. Accordingly, the electronic device 200 may detect the component 510d indicating the information about the ground by calculating a greatest accumulated value for each column.

Figure 6A:
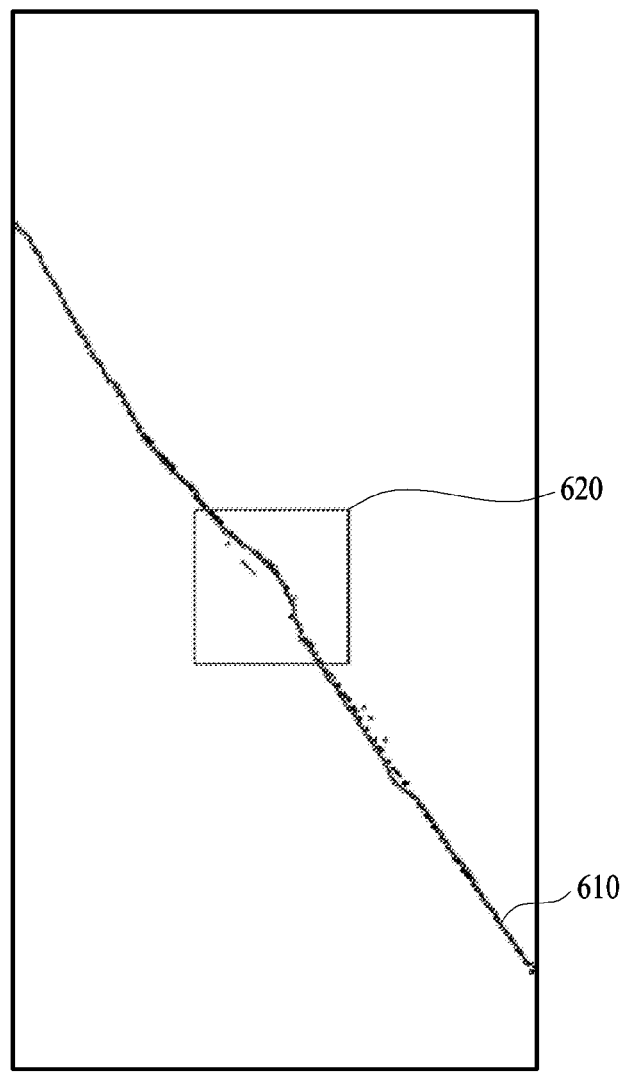
FIG. 6A is a diagram illustrating a method of determining a polynomial of a coordinate system in a V-disparity map for a component, according to an embodiment.

FIG. 6A is a diagram illustrating a method of determining a polynomial of a coordinate system in a V-disparity map for a component, according to an embodiment.

Referring to FIG. 6A, a curve 610 may be shown, which corresponds to the polynomial of a coordinate system in a V-disparity map for the component 510d indicating information about the ground, described with reference to FIG. 5D. The process of determining the polynomial based on the RANSAC algorithm may be similar to the process described with reference to FIG. 5A. K number points may be randomly selected from the V-disparity map and a virtual polynomial may be determined based on the selected k number points. The number T of components closest to the determined polynomial may be determined, and current parameters may be stored when the determined number T is greater than a threshold value. This process may be repeated N number times, and polynomial parameters that are finally stored may be returned. In this case, T and N may be arbitrarily set. The returned polynomial may be expressed as [Equation 2] below.

$$P(x) = a_n x^n + a_{n-1} x^{n-1} + \ldots + a_0 \qquad [\text{Equation 2}]$$

According to an aspect, the degree of the polynomial may be determined based on the Least Square Error (LSE) to determine the polynomial that best represents the shape of the ground. In this case, the coefficient of the polynomial with a minimum error may be determined by calculating an error in a quartic term or above, using [Equation 3] below for the polynomial returned based on the RANSAC algorithm.

$$E(a_4, a_5, \ldots, a_n) = \sum_{i=1}^{N_{row}} [y_i - P(x_i)]^2 \qquad [\text{Equation 3}]$$

In [Equation 3], $E(a_4, a_5, \ldots, a_n)$ may denote an error based on the LSE in the quartic term or above, $y_i$ may denote the vertical axis coordinate of the component on the V-disparity map, and $P(x_i)$ may denote a function value when $x_i$ is substituted.

The reason why the error is calculated in the quartic term or above may be that two inflection points or more may exist only when a greatest degree is 4 or above in the case of determining a linear line passing through two different inflection points.

Figure 6B:
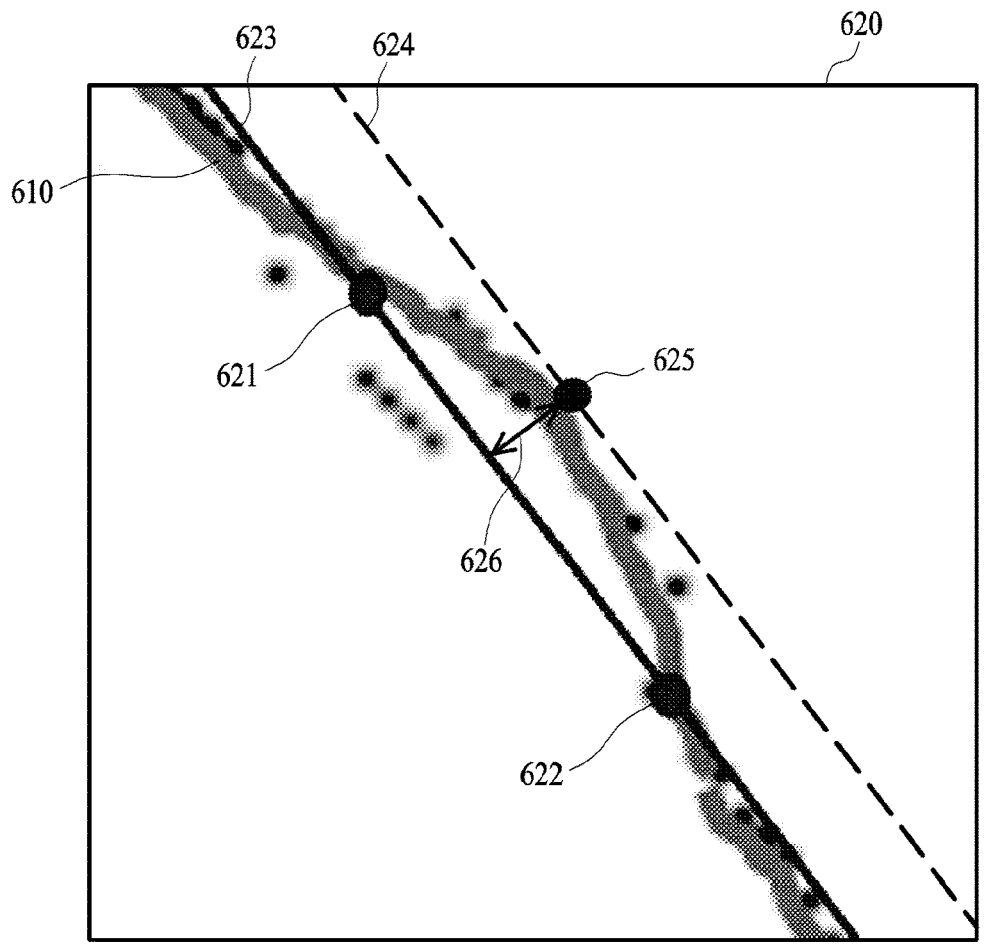
FIG. 6B is a diagram illustrating a method of determining a linear line passing through two different inflection points on a curve in the coordinate system of the V-disparity map, determining a target point on the curve, the target point having a tangential slope identical to the slope of the linear line, and calculating a distance between the linear line and the target point, according to an embodiment.

FIG. 6B is a diagram illustrating a method of determining a linear line passing through two different inflection points on a curve in the coordinate system of the V-disparity map, determining a target point on the curve, the target point having a tangential slope identical to the slope of the linear line, and calculating a distance between the linear line and the target point, according to an embodiment.

Referring to FIG. 6B, a portion 620 having bumps and depressions on the curve 610 corresponding to the polynomial of FIG. 6A may be enlarged. The curve 610 corresponding to the polynomial may have two different inflection points 621 and 622. The polynomial of degree 4 or higher may be expressed as [Equation 4] below.

$$f(x) = ax^4 + bx^3 + cx^2 + dx + e \qquad [\text{Equation 4}]$$

In this case, conditions for having two inflection points may be as shown in [Equation 5] below.

$$3b^2 - 8ac > \qquad [\text{Equation 5}]$$

When the function of [Equation 4], in which the conditions of [Equation 5] are satisfied, is divided by a second derivative function, the quotient and remainder may be expressed as in [Equation 6] below.

$$f(x) = f''(x)Q(x) + R(x) \qquad [\text{Equation 6}]$$

In [Equation 6], R(x) may denote a linear line 623 passing through the two inflection points 621 and 622 and have the form of [Equation 7] below.

$$R(x) = px + q \qquad [\text{Equation 7}]$$

In [Equation 7], a slope p between the two inflection points 621 and 622 on the linear line 623 may be as shown in [Equation 8] below.

$$p = \left(\frac{y_1 - y_2}{x_1 - x_2}\right) \qquad [\text{Equation 8}]$$

In [Equation 8], $(x_1, y_1)$ may denote the coordinates of the inflection point 621 and $(x_2, y_2)$ may denote the coordinates of the inflection point 622.

After the linear line 623 passing through the two inflection points 621 and 622 is determined, a linear line 624 having the same tangential slope as the linear line 623 may be determined to determine the coordinates of a target point 625. To determine the target point 625 with the same tangential slope as the slope p, $x_k$, in which a first derivative function $f'(x_k)$ becomes p, may be determined. In this case, the target point 625 may need to exist between the two inflection points 621 and 622, which may be shown as in [Equation 9] below.

$$f'(x_k)=p, (x_1 < x_k < x_2) \quad \text{[Equation 9]}$$

When the x coordinate of the target point 625 is determined to be $x_k$ in [Equation 9], $y_k$ may be determined by substituting $x_k$ for $f(x)$ in [Equation 4] and coordinates of the target point 625 may be determined.

A distance 626 between the target point 625 and the linear line 623 passing through the inflection points may be calculated by using [Equation 10] below.

$$d = \left( \frac{|px_k - y_k + q|}{\sqrt{p^2 + (-1)^2}} \right). \quad \text{[Equation 10]}$$

As described with reference to FIG. 3, when the curve corresponding to the polynomial in the coordinate system in the V-disparity map has three or more inflection points, the linear line 623 passing through two adjacent inflection points may be provided in plurality. When the linear line 623 is provided in plurality, a target point having the same tangential slope for each linear line may be determined and distances between a plurality of linear lines and a plurality of target points may be calculated.

Figure 7:
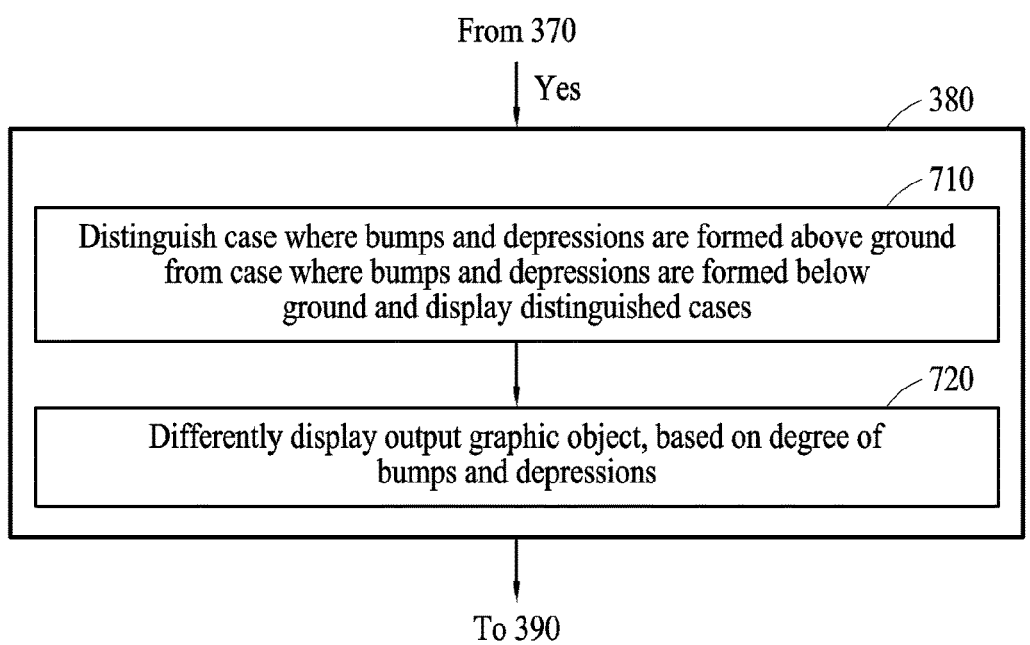
FIG. 7 is a diagram illustrating a method of displaying a point where bumps and depressions are present in a target image, according to an embodiment.

FIG. 7 is a diagram illustrating a method of displaying a point where bumps and depressions are present in a target image, according to an embodiment.

According to an aspect, operation 380 described above with reference to FIG. 3 may include operations 710 and 720 below.

In operation 710, the electronic device 200 may distinguish a case where bumps and depressions are formed above the ground from a case where the bumps and the depressions are formed below the ground in order to display a point (or an area) corresponding to the bumps and the depressions on the target image and may display the point corresponding to the bumps and the depressions, based on a result of distinguishing between the cases. For example, the electronic device 200 may output, in the target image, a graphic object with respect to the bumps and the depressions at the point corresponding to the bumps and the depressions.

In operation 720, the electronic device 200 may differentiate the output graphic object based on the degree of the bumps and the depressions. For example, the higher or the deeper the bumps and the depressions, the darker the color of the graphic object. The electronic device 200 may determine that the greater the distance 626 calculated in FIG. 6B, the greater the degree of the bumps and the depressions. The color of the graphic object may vary depending on the degree.

The electronic device 200 may display the point, in which the bumps and the depressions are present, on the windshield of a vehicle through a head-up display (HUD). However, the embodiment of displaying the information on the bumps and depression may not be limited to the described embodiment. The electronic device 200 may display the point where the bumps and the depressions are present, in various manners. A method of displaying the point where the bumps and depression are present on the target image is described in detail with reference to FIGS. 8A and 8B below.

Figure 8A:
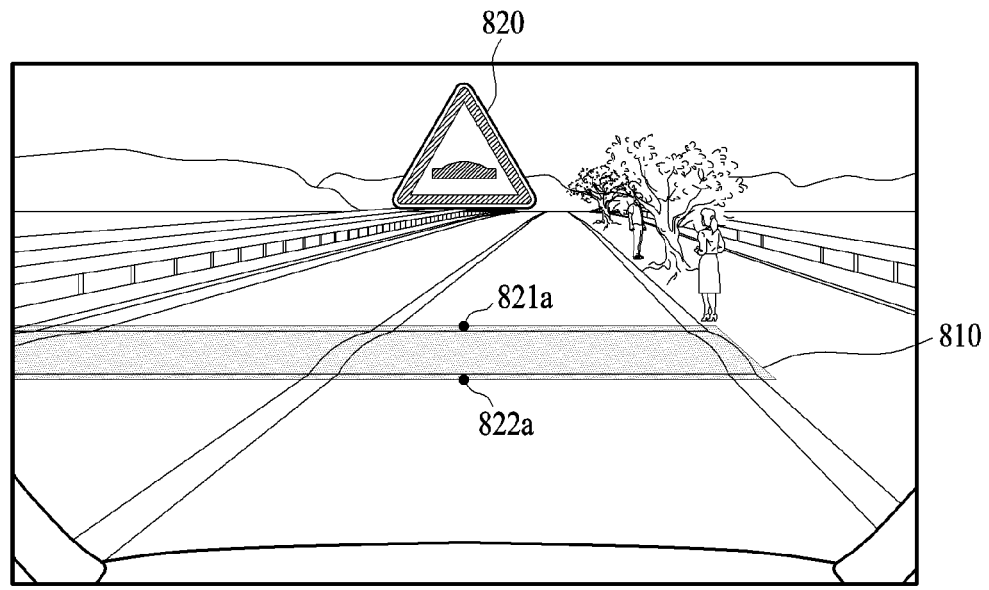
FIGS. 8A and 8B illustrate a point where bumps and depressions are present in a target image, according to an embodiment.
Figure 8B:
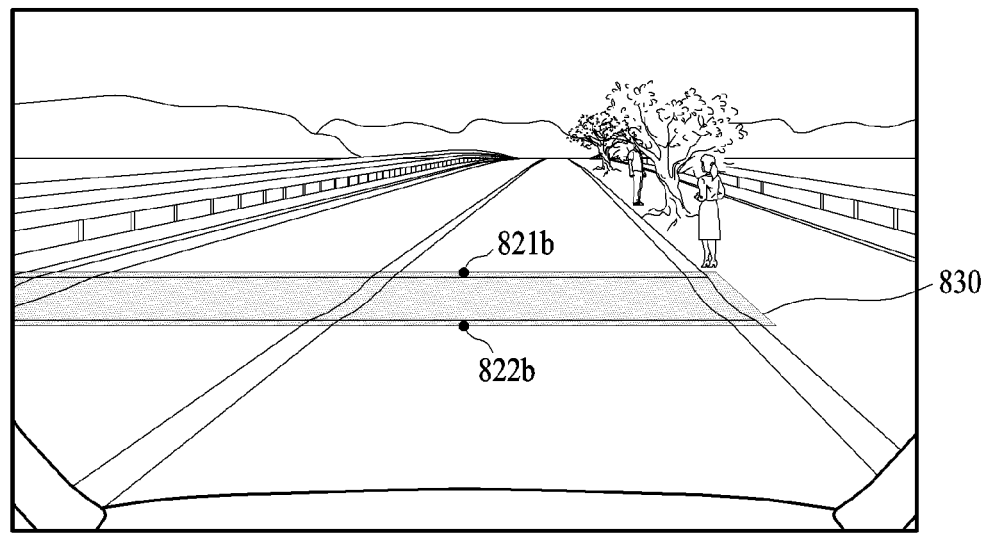

FIGS. 8A and 8B illustrate a method of outputting a graphic object at a point corresponding to bumps and depressions in a target image, according to an embodiment.

Referring to FIG. 8A, the target image in which bumps and depressions are present on the ground, according to an embodiment, may be illustrated. The electronic device 200 may determine coordinates 821a and 822a corresponding to the two inflection points 621 and 622 calculated in FIG. 6B in the target image and may place a computer graphic object 810 in an area corresponding to the bumps and the depressions. In addition, when a graphic object for a related traffic sign is stored in the electronic device 200, the electronic device 200 may output a graphic object 820, which corresponds to a related traffic sign, and additionally output a warning message, although not shown in FIG. 8A.

Referring to FIG. 8B, a target image, in which bumps and depressions are present below the ground, according to an embodiment may be shown. For example, the bumps and the depressions may be formed below the ground by land subsidence due to precipitation. As described with reference to FIG. 8A, the electronic device 200 may determine coordinates 821b and 822b corresponding to the two inflection points 621 and 622 calculated in FIG. 6B and may place a computer graphic object 830 in an area corresponding to the bumps and the depressions. In addition, an object corresponding to a traffic sign is not shown in FIG. 8B, unlike FIG. 8A, but the electronic device 200 may output a graphic object or a warning message for a related sign as shown in FIG. 8A.

Although the area 810 where the bumps and the depressions are present above the ground in FIG. 8A and the area 830 where the bumps and the depressions are present below the ground in FIG. 8B are illustrated in the same color in FIGS. 8A and 8B, the electronic device 200 may differently output the colors of the two areas. The greater the degree of the bumps and the depressions, the darker the color indicating the area, as described with reference to FIG. 7.

As described with reference to FIGS. 3 and 6B, when there are two or more areas where the bumps and the depressions are formed, according to the state of the ground, there may be two or more areas of the bumps and depressions in the target image, according to an embodiment. In this case, the electronic device 200 may output a computer graphic object, a traffic sign object, or a warning display for each of the areas of the bumps and the depressions in the target image.

The examples described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, other implementations, other examples, and equivalents to the claims are also within the scope of the following claims.

The invention claimed is:

1. A method of determining bumps and depressions on the ground, which is executed by an electronic device, the method comprises:
   acquiring a V-disparity map on a basis of a target image acquired by means of an image sensor;
   detecting, in the V-disparity map, at least one component indicating information about the ground in the target image;
   determining a polynomial in a coordinate system in the V-disparity map for the at least one component;
   determining a linear line passing through two different inflection points on a curve, which corresponds to the polynomial, in the coordinate system in the V-disparity map;
   determining a target point on the curve, the target point having a tangential slope identical to a slope of the linear line;
   calculating a distance between the linear line and the target point; and
   determining, on a basis of the distance, whether the ground comprises bumps and depressions;
   displaying a point where the bumps and the depressions are present, on the target image; and
   giving a warning in a form of visual or auditory feedback or generating a new driving path when a vehicle approaches the point.

2. The method of claim 1, wherein
   the electronic device is situated in a vehicle, and
   the target image is an image capturing surroundings of the vehicle.

3. The method of claim 2, wherein the vehicle is an autonomous vehicle or a vehicle supporting an Advanced Driver Assistance System (ADAS).

4. The method of claim 1, wherein the detecting of, in the V-disparity map, the at least one component indicating the information about the ground in the target image comprises:
   determining a horizontal line for a vanishing point of the target image, based on a Random Sample Consensus (RANSAC) algorithm; and
   detecting the at least one component indicating the information about the ground among components under the horizontal line.

5. The method of claim 1, wherein
   the determining of the polynomial in the coordinate system in the V-disparity map for the at least one component comprises:
   determining the polynomial based on a Random Sample Consensus (RANSAC) algorithm.

6. The method of claim 1, wherein
   the determining of the polynomial in the coordinate system in the V-disparity map for the at least one component comprises:
   determining a degree of the polynomial based on a Least Square Error (LSE).

7. The method of claim 1, wherein
   the determining of the linear line passing through the two different inflection points on the curve, which corresponds to the polynomial, in the coordinate system in the V-disparity map comprises:
   when a number of inflection points on the curve is three or more, determining a plurality of linear lines passing through two adjacent inflection points.

8. The method of claim 1, wherein the displaying of the point where the bumps and the depressions are present, on the target image comprises:
   distinguishing a case where the bumps and the depressions are formed above the ground from a case where the bumps and the depressions are formed below the ground and displaying the distinguished cases; and
   differentiating an output graphic object based on a degree of the bumps and the depressions.

9. A non-transitory computer-readable storage medium storing instructions that, when executed by a processor, cause the processor to perform the method of claim 1.

10. An electronic device for performing a method of determining bumps and depressions on the ground, the electronic device comprises:
- a memory configured to store a program for determining the bumps and the depressions on the ground; and
- a processor configured to execute the program,
- wherein the processor is configured to:
- acquire a V-disparity map on a basis of a target image acquired by means of an image sensor;
- detect, in the V-disparity map, at least one component indicating information about the ground in the target image;
- determine a polynomial in a coordinate system in the V-disparity map for the at least one component;
- determine a linear line passing through two different inflection points on a curve, which corresponds to the polynomial, in the coordinate system in the V-disparity map;
- determine a target point on the curve, the target point having a tangential slope identical to a slope of the linear line;
- calculate the distance between the linear line and the target point; and
- determine, on the basis of the distance, whether the ground comprises bumps and depressions;
- display a point where the bumps and the depressions are present, on the target image; and
- give a warning in a form of visual or auditory feedback or generate a new driving path when a vehicle approaches the point.

11. The electronic device of claim 10, wherein
the electronic device is situated in a vehicle, and
the target image is an image capturing surroundings of the vehicle.

12. The electronic device of claim 11, wherein the vehicle is an autonomous vehicle or a vehicle supporting an Advanced Driver Assistance System (ADAS).

13. The electronic device of claim 10, wherein the detecting of, in the V-disparity map, the at least one component indicating the information about the ground in the target image comprises:
- determining a horizontal line for a vanishing point of the target image, based on a Random Sample Consensus (RANSAC) algorithm; and
- detecting the at least one component indicating the information about the ground among components under the horizontal line.

14. The electronic device of claim 10, wherein
the determining of the polynomial in the coordinate system in the V-disparity map for the at least one component comprises:
determining the polynomial based on a Random Sample Consensus (RANSAC) algorithm.

15. The electronic device of claim 10, wherein
the determining of the polynomial in the coordinate system in the V-disparity map for the at least one component comprises:
determining a degree of the polynomial based on a Least Square Error (LSE).

16. The electronic device of claim 10, wherein
the determining of the linear line passing through the two different inflection points on the curve, which corresponds to the polynomial, in the coordinate system in the V-disparity map comprises:
when a number of inflection points on the curve is three or more, determining a plurality of linear lines passing through two adjacent inflection points.

17. The electronic device of claim 10, wherein
the displaying of the point where the bumps and the depressions are present, on the target image comprises:
distinguishing a case where the bumps and the depressions are formed above the ground from a case where the bumps and the depressions are formed below the ground and displaying the distinguished cases; and
differentiating an output graphic object based on a degree of the bumps and the depressions.

* * * * *